US009836552B2

(12) United States Patent
Diament et al.

(10) Patent No.: US 9,836,552 B2
(45) Date of Patent: *Dec. 5, 2017

(54) GUI FOR VIEWING AND MANIPULATING CONNECTED TAG CLOUDS

(71) Applicant: International Business Machines Corporation, Armonk, NY (US)

(72) Inventors: Judah M. Diament, Yorktown Heights, NY (US); Aliza R. Heching, New York, NY (US); Peter K. Malkin, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/967,685

(22) Filed: Aug. 15, 2013

(65) Prior Publication Data
US 2014/0195950 A1  Jul. 10, 2014

Related U.S. Application Data

(63) Continuation of application No. 13/736,610, filed on Jan. 8, 2013.

(51) Int. Cl.
*G06F 17/30*  (2006.01)
(52) U.S. Cl.
CPC .. *G06F 17/30958* (2013.01); *G06F 17/30716* (2013.01)
(58) Field of Classification Search
None
See application file for complete search history.

(56) References Cited

U.S. PATENT DOCUMENTS 5,450,535 A * 9/1995 North ............... G06T 11/206
  345/440
6,338,062 B1 * 1/2002 Liu .................. G06F 17/30707
(Continued)

FOREIGN PATENT DOCUMENTS

WO  2011070225  6/2011

OTHER PUBLICATIONS

Collins, C.; Viegas, F.B.; Wattenberg, M., "Parallel Tag Clouds to explore and analyze faceted text corpora," Visual Analytics Science and Technology, 2009. VAST 2009. IEEE Symposium on , vol., No., pp. 91,98, Oct. 12-13, 2009 doi: 10.1109/VAST.2009.5333443, Web. Jun. 6, 2014. <ieeexplore.ieee.org/xpls/abs_all.jsp?arnumber=5333443>.*

(Continued)

*Primary Examiner* — Mariela Reyes
*Assistant Examiner* — Edward Jacobs
(74) *Attorney, Agent, or Firm* — Scully, Scott, Murphy & Presser, P.C.; Yeen C. Tham, Esq.

(57) ABSTRACT

A method of visualizing and interacting with a given term graph for a given group G defined by a set of values d for a set of dimensions D and topic X, may comprise obtaining the term graph associated with the given group G and the topic X; displaying the topic X in a tag cloud; representing each term from the term graph as a tag in the tag cloud, wherein a distance of a given tag from the displayed topic X in the tag cloud represents a distance of a term represented by the given tag from the topic X in the term graph; and visually representing a tag's importance relative to one or more of resources associated with the given group G in the tag cloud.

11 Claims, 8 Drawing Sheets

(56) References Cited

U.S. PATENT DOCUMENTS

| | | | |
|---|---|---|---|
| 6,678,677 B2* | 1/2004 | Roux | G06F 17/30684 |
| 6,711,585 B1* | 3/2004 | Copperman | G06F 17/30616 |
| 6,938,044 B1* | 8/2005 | Milby | G06F 17/30342 |
| 7,007,018 B1 | 2/2006 | Kirkwood et al. | |
| 7,062,705 B1* | 6/2006 | Kirkwood | G06Q 10/10 |
| | | | 707/E17.008 |
| 7,970,764 B1* | 6/2011 | Ershov | G06F 17/30873 |
| | | | 706/12 |
| 8,239,455 B2 | 8/2012 | Wang | |
| 8,260,779 B2 | 9/2012 | Hudgins et al. | |
| 8,674,993 B1* | 3/2014 | Fleming | G06Q 40/06 |
| | | | 345/440 |
| 8,676,732 B2* | 3/2014 | Sweeney | G06F 17/30867 |
| | | | 706/12 |
| 8,843,997 B1* | 9/2014 | Hare | H04L 63/0281 |
| | | | 709/200 |
| 2003/0050915 A1* | 3/2003 | Allemang | G06F 17/30731 |
| 2003/0112273 A1* | 6/2003 | Hadfield | G06Q 10/10 |
| | | | 715/751 |
| 2003/0177112 A1* | 9/2003 | Gardner | G06F 19/28 |
| 2003/0233345 A1* | 12/2003 | Perisic | G06F 17/30867 |
| 2004/0024739 A1* | 2/2004 | Copperman et al. | 707/1 |
| 2005/0114384 A1* | 5/2005 | Beringer | G06F 17/30991 |
| 2006/0053098 A1* | 3/2006 | Gardner | G06F 17/30734 |
| 2006/0053151 A1* | 3/2006 | Gardner | G06F 17/279 |
| 2006/0074836 A1* | 4/2006 | Gardner | G06N 5/02 |
| | | | 706/60 |
| 2006/0167946 A1* | 7/2006 | Hellman | G06F 17/30557 |
| 2007/0234218 A1* | 10/2007 | Baschy | G06F 21/604 |
| | | | 715/741 |
| 2007/0240203 A1* | 10/2007 | Beck | G06F 19/322 |
| | | | 726/4 |
| 2007/0288602 A1* | 12/2007 | Sundaresan | G06Q 30/06 |
| | | | 709/219 |
| 2008/0065452 A1* | 3/2008 | Naeymi-Rad | G06F 19/322 |
| | | | 705/1.1 |
| 2008/0072145 A1* | 3/2008 | Blanchard | G06F 17/22 |
| | | | 715/273 |
| 2008/0256134 A1* | 10/2008 | Bogner | G06Q 10/10 |
| 2009/0012842 A1* | 1/2009 | Srinivasan | G06F 17/30684 |
| | | | 705/12 |
| 2009/0187829 A1* | 7/2009 | Brownholtz | G06Q 30/02 |
| | | | 715/739 |
| 2010/0030552 A1* | 2/2010 | Chen | G06F 17/30734 |
| | | | 704/9 |
| 2010/0049766 A1* | 2/2010 | Sweeney | G06F 17/30705 |
| | | | 707/737 |
| 2010/0070517 A1 | 3/2010 | Ghosh et al. | |
| 2010/0325584 A1* | 12/2010 | McKenzie | G06Q 50/18 |
| | | | 715/835 |
| 2011/0113385 A1* | 5/2011 | Sayers | G06F 17/30873 |
| | | | 715/853 |
| 2011/0113386 A1* | 5/2011 | Sweeney | G06F 17/30731 |
| | | | 715/853 |
| 2011/0295859 A1 | 12/2011 | Friedman et al. | |
| 2012/0005195 A1* | 1/2012 | Cain, Jr. | G06F 17/30734 |
| | | | 707/722 |
| 2012/0016907 A1* | 1/2012 | Ikeda | G06F 21/10 |
| | | | 707/783 |
| 2012/0095978 A1 | 4/2012 | Levin et al. | |
| 2012/0139932 A1 | 6/2012 | Sakamoto | |
| 2012/0150859 A1* | 6/2012 | Hu | G06Q 10/00 |
| | | | 707/737 |
| 2012/0150878 A1* | 6/2012 | Naeymi-Rad | G06Q 50/22 |
| | | | 707/752 |
| 2012/0154633 A1 | 6/2012 | Rodriguez | |
| 2012/0158719 A1 | 6/2012 | Gannu et al. | |
| 2012/0158989 A1 | 6/2012 | Patil et al. | |
| 2012/0166372 A1* | 6/2012 | Ilyas | G06F 17/30914 |
| | | | 706/14 |
| 2012/0216290 A1* | 8/2012 | Roy | G06F 21/10 |
| | | | 726/27 |
| 2013/0066921 A1* | 3/2013 | Mark | G06F 17/30734 |
| | | | 707/794 |
| 2013/0096944 A1* | 4/2013 | Shah | G06Q 50/24 |
| | | | 705/3 |
| 2013/0132442 A1* | 5/2013 | Tsatsou | G06F 17/30734 |
| | | | 707/798 |
| 2013/0339396 A1 | 12/2013 | Lamanna et al. | |

OTHER PUBLICATIONS

Kaser et al., "TagCloud Drawing: Algorithms for Cloud Visualization" WWW2007, May 8-12, 2007, pp. 1-10, Banff, Canada.

Kim et al., "Representing and sharing folksonomies with semantics," Journal of Information Science OnlineFirst, published on Sep. 24, 2009, pp. 1-16, as doi:10.1177/0165551509346785.

Rettberg, "'Freshly Generated for You, and Barack Obama'" European Journal of Communication Copyright © The Author(s), Nov. 28, 2009. Reprints and Permissions: http://www.sagepub.co.uk/journals Permissions.nav vol. 24 (4): 451-466. [10.1177/0267323109345715].

Trattner et al., "Linking Related Documents: Combining Tag Clouds and Search Queries"Web Engineering, Jul. 2010, pp. 486-489,—Springer.

Rahman et al., "Building Dynamic Social Network From Sensory Data Feed," IEEE Transactions on Instrumentation and Measurement, pp. 1327-1341, vol. 59, No. 5, May 2010.

Paelke et al., "Location Based Context Awareness Through Tag-Cloud Visualizations" The International Archives of the Photogrammetry, Remote Sensing and Spatial Information Sciences, vol. 38, Part II, May 26-28, 2010, pp. 290-295.

Hartel et al., "Modeling a description logic vocabulary for cancer research," Journal of Biomedical Informatics 38 (Feb. 2005) pp. 114-129.

Pathak et al., "Applying Linked Data Principles to Represent Patient's Electronic Health Records at Mayo Clinic: A Case Report," IHI'12, Jan. 28-30, 2012, pp. 455-464, Miami, Florida, USA.

Mason et al., "Dynamic Database Integration in a JDBC Driver," 7th International Conference on Enterprise Information Systems, pp. 326-333, May 25-28, 2005.

Delahousse, "Topic Maps: backbone of Content Intelligence," XML, Dec. 18, 2002, pp. 1-9, Proceedings by deepX.

Office Action dated Jun. 24, 2014 received in U.S. Appl. No. 13/736,610.

Office Action dated Jan. 9, 2015 received in U.S. Appl. No. 13/967,662.

Office Action dated Jan. 9, 2015 received in U.S. Appl. No. 13/736,543.

Office Action dated Apr. 26, 2016 received in U.S. Appl. No. 13/967,685, 27 pages.

Office Action dated Apr. 6, 2016 received in U.S. Appl. No. 13/967,662, 24 pages.

Office Action dated Oct. 17, 2016 received in U.S. Appl. No. 13/736,543, 27 pages.

Office Action dated Oct. 19, 2016 received in U.S. Appl. No. 13/967,662, 34 pages.

Office Action dated Oct. 27, 2016 received in U.S. Appl. No. 13/736,610, 35 pages.

Office Action dated Feb. 24, 2017 received in parent U.S. Appl. No. 13/736,610, 28 pages.

Office Action dated Mar. 9, 2017 received in U.S. Appl. No. 13/736,543, 23 pages.

Office Action dated Jun. 19, 2014 received in U.S. Appl. No. 13/736,543.

\* cited by examiner

US 9,836,552 B2

GUI FOR VIEWING AND MANIPULATING CONNECTED TAG CLOUDS

CROSS-REFERENCE TO RELATED APPLICATIONS

This application is a continuation of U.S. Ser. No. 13/736,610, filed on Jan. 8, 2013, the entire content and disclosure of which is incorporated herein by reference.

The present invention is related to commonly-owned, co-pending U.S. Ser. No. 13/736,543 entitled, "CREATING DIMENSION/TOPIC TERM SUBGRAPHS" and filed on Jan. 8, 2013, the entire content and disclosure of which is expressly incorporated by reference herein as if fully set forth herein.

FIELD

The present application relates generally to computers, and computer applications, and more particularly to a graphical user interface for visual representation of terms and/or data structure graphs representing terms.

BACKGROUND

The backgrounds, skill set, and knowledge base of different people within a single organization often vary widely. As such, two such people may have difficulty communicating with each other about a matter of shared interest. In a manufacturing business, for example, senior executives may think about product lines in terms of cost, revenue, and financial efficiency of the production process, while those managing the production lines may be focused on the machinery/robotics used in production, the skills balance and morale of the workers on the production line, safety regulations, etc. Were the senior executive and the production line manager to have a conversation about a certain product, they are likely to have a difficult time communicating effectively with each other. While they both are talking about the same product in the same company, are both well informed, and have some shared knowledge about the product and company, enough of their perspectives and knowledge bases are sufficiently disjoint as to make communicating difficult due to lack of shared vocabulary and knowledge.

As another example, a researcher and a product development manager each may have very different backgrounds, skill sets, perspectives, and priorities, and, as such, very different vocabularies. As they attempt to converse, each may use words and concepts that are clear to the party conveying the information, but may be either misunderstood or not understood at all by the other party.

BRIEF SUMMARY

A method and system for viewing and manipulating one or more tag clouds are presented. In one aspect, a method of visualizing and interacting with a given term graph for a given group G defined by a set of values d for a set of dimensions D and topic X, may be provided that comprises obtaining the term graph associated with the given group G and the topic X. The method may also comprise displaying the topic X in a tag cloud. The method may further comprise representing each term from the term graph as a tag in the tag cloud, wherein a distance of a given tag from the displayed topic X in the tag cloud represents a distance of a term represented by the given tag from the topic X in the term graph. The method may also comprise visually representing a tag's importance relative to one or more of resources associated with the given group G in the tag cloud.

In another aspect, a method of visualizing and interacting with a joint term graph for a given topic X and two or more group Gs, each of the group Gs defined by a set of values d for a set of dimensions D may be provided that may comprise identifying one or more shared terms that are commonly used in two or more term graphs associate with respective two or more group Gs. The method may further comprise presenting the shared terms. The method may also comprise retrieving a term graph associated with said each group G associated with topic X. The method may further comprise identifying a set of terms in the term graph associated with said each group G. The method may also comprise displaying the set of terms as tags in a tag cloud for each group G, wherein multiple tag clouds are displayed. The method may further comprise linking, for each of the shared terms, a shared term to a tag in the tag clouds that represents a same term as the shared term.

A system for visualizing and interacting with a given term graph for a given group G defined by a set of values d for a set of dimensions D and topic X, in one aspect, may comprise a graphical user interface module operable to execute on a processor and further operable to obtain the term graph associated with the given group G and the topic X. The module may be further operable to display the topic X in a tag cloud, represent each term from the term graph as a tag in the tag cloud, wherein a distance of a given tag from the displayed topic X in the tag cloud represents a distance of a term represented by the given tag from the topic X in the term graph. The graphical interface module may be further operable to visually represent a tag's importance relative to one or more of resources associated with the given group G in the tag cloud.

Yet in another aspect, the graphical user interface module may be further operable to present the shared terms by displaying each of the shared terms as a tag in a shared-tag tag cloud separate from the multiple tag clouds. The tag may further include attributes associated with the shared term.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Figure 1:
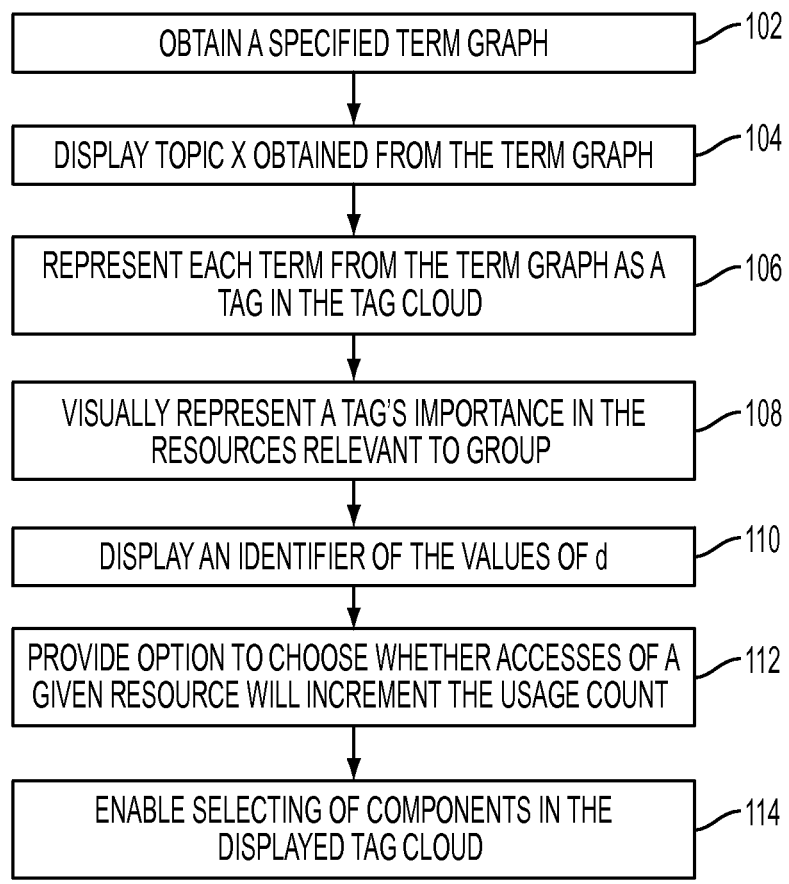
FIG. 1 is a flow diagram illustrating a method of visualizing and interacting with a given term graph in one embodiment of the present disclosure.

A methodology is presented that provides better context and understanding for interpersonal and/or other communications, and thus facilitate better communication. For instance, parties communicating with one another may be provided with a way to understand each other's vocabulary and perspective, and to find common ground on which they can communicate. Specifically, in one aspect, management of vocabularies or terminology within an organization of persons may be provided, by creating a graph data structure that can use terms located in documents relevant to a user, group, and/or time frame that are to a particular issue or concept wherein the relative importance of those terms to the user, group or time frame are stored. The importance may be measured based on the amount of access or usage of the documents by the user or group of users. Additionally, a related data structure may provide for storing of metrics related to how strongly terms are shared between different users, groups or time frames. These types of data structures may be helpful in a large enterprise or government that can track document usage patterns by individuals within the enterprise. For example, the data structure of the present disclosure in one embodiment would be useful or helpful in a case in which a person in one area of the enterprise would like to have some understanding about the terms most relevant to person(s) in another area of the enterprise relative to an issue or concept. An interested user could, for example, retrieve a listing or word cloud with the most important terms relative to another person in the organization, e.g., chief executive officer (CEO) with respect to a specific product.

The related U.S. Ser. No. 13/736,543 entitled, "CREATING DIMENSION/TOPIC TERM SUBGRAPHS" discloses a methodology to create and define the above-described data structures referred to as term graphs and shared-term term graphs. The present disclosure in one aspect defines the visual representation of, and interaction with, connected tag clouds and shared-tag tag clouds, which aid in understanding of the terms in term graphs, their importance and centrality in individual data sets as well as in the aggregate across a set of data sets. The visual representation of the present disclosure in one aspect may clarify for all parties the perspectives of each person or another dimension, both individually and in relation to each other.

A tag cloud is a visual representation or display of set of text, words or terms. A tag in a tag cloud is a text, word, or term appearing in that tag cloud (representation or display set). Tag clouds are used to visualize the usage of a set of terms within a discrete set of data (e.g., a set of web pages, tags in social software, etc.), where the visual representation of each tag is affected by factors such as frequency of use of a term in a data set, number of documents assigned to a group represented by the term, etc. For instance, some visual aspects of the words or terms (e.g., size) may be used to represent the frequency of the words used within a document or documents. The present disclosure one aspect may provide for aggregating the tag clouds to into single representation of multiple tag clouds. Multiple tag clouds can be displayed side by side for visual comparison purposes, where the visual comparison may focus on the presence or absence of words, their size, etc. in each cloud. For example, a shared-tag tag cloud can aggregate the terms that appear in the tag cloud for documents associated with person A and the terms that appear in the tag cloud for document associated with person B, allowing for an easy understanding of the shared terms relevant to each person.

In a display and interaction of tag clouds, any attribute of the data from which a tag cloud is created may be used to determine both visual attributes of individual tags in the cloud, as well as the visual organization of the cloud as a whole. Visual attributes of individual tags may include, but are not limited to: display size, color, font, weight (bold, italics, etc.), decorations (underline, starred, icon badges, etc.), and other visual cues.

Tag clouds may be visually organized in any of a number of ways, including, e.g., but not limited to: ordering of the tags in some sequence—number order, alphabetical order, etc.; most important, for predefined measure of importance, tags in the center, progressively less important tags progressively farther from the center, etc.; tags found in proximity to each other, for predefined measure of proximity, in the source data can have a corresponding visual proximity in the tag cloud; and other organization methods.

The links to the resources in which a given term, represented by a tag, may be employed by a user interface (UI) to allow users to access the resources. For example, when one tag cloud is being displayed by itself, selecting (for example, clicking, touching, etc.) a tag or a number shows a pop-up view which provides links to all the resources in which the tag's term was used. Selecting a link may display the document (resource) with all instances of the selected term highlighted. Seeing the document itself gives the user the opportunity to better understand the context in which the term was used.

A tag cloud is used to provide a visualization of the data set (DS) from which it was derived. Tag clouds may be derived from a wide range of data sources. In the state of the art, tag clouds are commonly created from the words used in a set of documents or tags used in software. Tag clouds can additionally be derived from other types of data, where the tags are computationally derived from the source data. For example, given an image data base, image processing techniques can be employed to determine the hexadecimal color values of all the colors used in the images and the frequency with which each color is used. The cloud can then display the colors values, where the text of each tag is the color value, the color of the tag is the color specified by the color value, and the size of the tag is the frequency with which that color is used in the set of source images.

The unassisted or manual visual comparison of tag clouds usually require users to find commonality among the tag clouds on their own, a potentially difficult task for sufficiently large tag clouds, and may result in different users, or the same user on different occasions, arriving at different conclusions about the comparison.

The present disclosure in one embodiment introduces the notion of two or more tag clouds being logically connected to each other to address the shortcomings of unassisted or manual visual comparison. In one aspect, the tag clouds are connected via tags that are contained in two or more of the tag clouds. Tags, for example, represent terms or words, or other elements in a resource (e.g., document). A connection may be formed between a tag in tag cloud A and a tag in tag cloud B by any number of means; they need not come from the same system, share the same underlying data structures, etc.

Methods for a connection may include: determining that the entity represented by the tags come from the same source system and are identical in that source system; Determining that the tags are identical, equal, or similar; Determining that the tags are semantically identical, equal, or similar; Determining that the usage of the tags in the source data sets were identical, equal, or similar; and others. Connecting the tag clouds enables users to quickly find a tag in other tag clouds once it is found in a single tag cloud and also to easily see the different representations of the tag in each of the connected tag clouds.

In displaying and interacting with connected tag clouds, a selection of a tag in any individual tag cloud may show the display of that term in all currently displayed tag clouds in more prominent manner (for example, by highlighting it, changing its color, etc.). The increased emphasis or prominence of the shared tag in the two or more connected tag clouds enables the user to quickly and easily compare all of the visual attributes of the given tag across the two or more tag clouds. This enables the user to comprehend and compare/contrast the underlying values, visualized via the employed visual attributes, of the data represented by the tags in the two or more tag clouds.

Alternatively, or in addition, selection of a tag may cause the explicit display of the underlying values of the data represented by the tags in the two or more tag clouds. The data values from each tag cloud may be presented individually or in a view such as a table that facilitates quick comparison. An alternate selection (for example, double click, double tap, command-click, etc.) of the tag in any of the tag clouds may display the underlying data or links to the underlying data.

As described above, tag clouds may be used to visualize the usage of a set of terms within a discrete set of data. Multiple tag clouds can be displayed side by side for visual comparison. Connected tag clouds can aid users in comparing and/or finding tags in multiple, large tag clouds. However, a user may wish to understand the aggregate, or shared, value (importance, frequency, etc.) of a datum underlying a given tag across a group of data sets (e.g., rather than in only one discrete data set) while simultaneously understanding its value in each discrete data set. In other words, the user may wish to understand a datum's role across the multiple data sets, not just in one discrete data set represented by one cloud. For example, user A may want to see how important a given term or concept is to two people individually, and user A may also want to simultaneously see how strongly that term or concept is shared between them.

In one embodiment of the present disclosure, a notion of shared-tag tag cloud (STTC) is introduced and a visualization methodology of STTC is presented. Shared-Tag tag clouds of the present disclosure in one embodiment enable capabilities such as consistent comparison across multiple tag clouds, and understanding of the aggregate, or shared, value of terms across a group of data sets. In a shared-tag tag cloud, tags represent the aggregate, or shared, values of a tag across multiple data sets, rather than the presence or value of a term in a single data set. A shared-tag tag cloud is connected to (usually multiple) other connected tag clouds whose tags it is aggregating. Interactions with the shared-tag tag cloud affect the display and/or behavior of the other tag clouds, and vice versa.

Both the visual attributes of individual tags in a tag cloud, as well as the layout and/or organization of the tags within the tag cloud, can be driven by the values, or a function on the values, of the underlying data. In a STTC of the present disclosure in one embodiment, the visual attributes and layout are calculated based on the attributes and/or layout in the connected tag clouds. Examples of such calculations may include: the value of the attribute may be a function of the number of common or equal data points which were employed when calculating the tag's visual attribute in each of the connected tag clouds; if the size of tags in the connected tag clouds is determined by the frequency of use of a term in the source data, the size of the tag in the shared-tag tag cloud can be the average, sum, etc. of those frequencies.

The algorithm that defines how the attributes of the connected tag clouds should be combined in the STTC can be fixed or defined/configured by a user. In one aspect, a shared-tag tag cloud may be displayed as follows. Assuming there are n data sets, and n connected tag clouds derived from them, then for each tag, up to n+1 values may be displayed for each attribute in the STTC: one for the value of that attribute in each connected tag cloud, and one for the aggregate/shared value. For instance, assuming there are n sets of values of dimension D, and thus potentially n groups (Gs), for each tag, n+1 numbers or values may be displayed with the shared-tag tag cloud: one number for the importance of that term in resources relevant to each G (i.e., relevant to each value of D), and one for the number of shared usages.

These values may be displayed, for example, in a tool tip that appears when a user hovers the mouse over a tag in the STTC, in a list below each tag, etc. Displaying the up to n+1 values allows for very quick comparison of underlying data values across data sets. The attribute value displayed for each cloud may have an associated indicator (e.g., the initials of the person represented by each G, where d is person) so the user can identify the cloud with which the value is associated. For instance, the importance numbers for each value of D may have an associated indicator (e.g., the initials of the person represented by each G, where d is person) so the user can identify the associated value of D, and thus the group G, that the importance measure is associated with.

The visualization methodology of the present disclosure allows a user to choose to show or hide the individual attribute values (e.g., the importance values), as displaying them may crowd the view when there is a large number of connected tag clouds. When the individual attribute (e.g., importance) measures are not shown, they will still be able to be seen via the connections between the clouds, as described below.

A selection of a tag in any individual tag cloud, or in the STTC may make the display of that term in all tag clouds be more prominent (for example, by highlighting it, changing its color, etc.), e.g., so the user can quickly see how central that term is to each group vis-a-vis topic X, as well as how heavily it is shared. A selection of an attribute value of one of the connected tag clouds being displayed in a STTC may show a view which provides links to the data that was related to that tag cloud in the context of the tag the attribute relates to. A selection of the aggregate/shared attribute value may show a view which provides links to all the data in the two or more connected tag clouds from which the aggregate/shared value was calculated. Selecting the link may show the resource.

A methodology of the present disclosure in one embodiment enables for visualization of relationships between terms in two or more tag clouds, i.e., connected tag cloud. Shared-Tag tag clouds (STTC) and visualization thereof, of the present disclosure, enables one to view a summary of two or more other clouds and their relative values. The methodology of the present disclosure in another aspect derives aggregate/shared values for visual and layout attributes in a STTC as a function of the values in the connected tag clouds. That function may be user definable. The interactions are enabled between the user and both the connected tag clouds as well as the user and the STTC.

Figure 5:
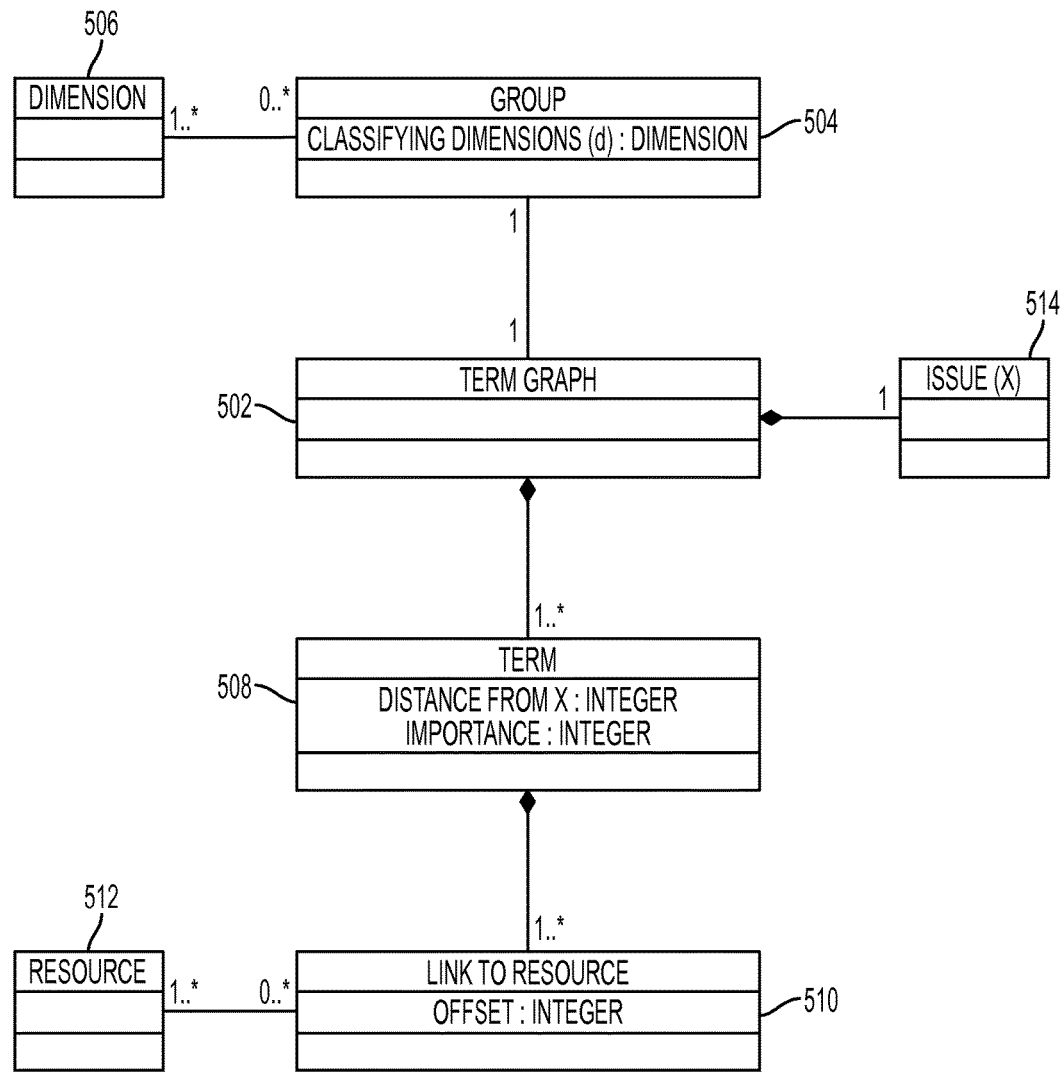
FIG. 5 illustrates a data model of a term graph in one embodiment of the present disclosure.

FIG. 1 is a flow diagram illustrating a method of visualizing and interacting with a given term graph in one embodiment of the present disclosure. The methodology of the present disclosure may be embodied as a graphical user interface system in one embodiment. The given term graph may be for a given group G, defined by a set of values d for a set of dimensions D and topic X. A data model of a term graph in one embodiment of the present disclosure is illustrated in FIG. 5.

A separate term graph is created of the terms/concepts found to be relevant to each G. Any two term graphs may be connected when they share at least one term. Each term graph (e.g., 502) in one embodiment of the present disclosure includes one or more D values (d) 506 that defined the classification for G 504. As an example, a visualization of a D value (e.g., a picture from a corporate directory) may be generated and displayed near the term graph in a GUI to remind a user which D values define the term graph being viewed. A term graph 502 also includes a node 508 for each term in G, with node attributes, e.g., including: the term, the shortest distance from the term to X in the ontology, the term's importance which represents the importance of a term in G. Other attributes may be included. A distance represents how closely the terms are related. For example, the distance from a term to X represents how closely that term is related to X (given topic).

Importance, for example, can be determined by: frequency of use, location of usage (e.g., physical location of user when using the term), client device from which the user employs the term, use in certain key documents, use by certain key people, use in certain key contexts, any combination of the above. The importance of a term in G vis-à-vis X may be represented by an importance number. The importance number may be used to determine a tag's display size, and may be displayed, for example, below the tag.

Each term may be represented in a GUI as a tag in a graphical rendering of a tag cloud. The distance of a given tag from X in the tag cloud represents the distance of that tag from X in the connected term graph. In a GUI, this may be represented by displaying X in the middle of the cloud and the on-screen distance of each term, represented as a tag, may be calculated based on the distance of the tag from X in the graph.

Optionally, a term graph 502 may also include links to all the resources 510, 512 wherein the term was used in conjunction with X 514 and relevant to G's D value. Such node 510 may include as attributes, offsets (e.g., location of the term in the resource) to all instances of the term in each resource linked to may be stored, e.g., to allow quick access to the term in the context of the resource. In one aspect, links to all the resources wherein the tag's term was used in conjunction with X and relevant to G's D value may be stored with each term in each connected tag cloud (representing a term graph). These links may be used by a GUI to allow users to access the resources. For example, when one tag cloud (representing a term graph), for one G, is being displayed by itself, selecting (by for example, clicking, touching, etc.) a tag or a number may show a view which provides links to all the resources wherein the tag's term was used in conjunction with X and relevant to G's D value. Selecting a link may display the document with all instances of the selected term and of X highlighted. Seeing the document itself gives the user the opportunity to understand better the context in which the term was used.

When the user accesses a document, that access itself could designate the document as being relevant to multiple D values (e.g., the person accessing it, their role, the time, etc.). One can choose to include or exclude this access from the accesses recorded in the methodology of the present disclosure.

Referring to FIG. 1, at 102, the given term graph is obtained, e.g., by retrieving the term graph from a database. At 104, topic X obtained from a topic node of the term graph is displayed. At 106, each term from the term graph is represented as a tag and displayed in the tag cloud. The distance of a given tag from the displayed topic X in the tag cloud represents the distance of that tag from X in the connected term graph. At 108, a tag's importance in the resources relevant to group G is represented visually, for example by its size, by the actual importance number being displayed, and/or in another manner.

In one embodiment, optionally at 110, an identifier of the values of d may be displayed (e.g., a picture from the corporate directory) near the cloud to remind the user which G's term graph is being viewed.

At 112, the method may further comprise allowing one to choose whether accesses of a given resource from the current graphical user interface will increment the usage count of the given resource (e.g., if resource A is so designated, then multiple accesses of A from the user interface via which the term graph (tag cloud) is being visualized may or may not result in A's usage count increasing).

Figure 2:
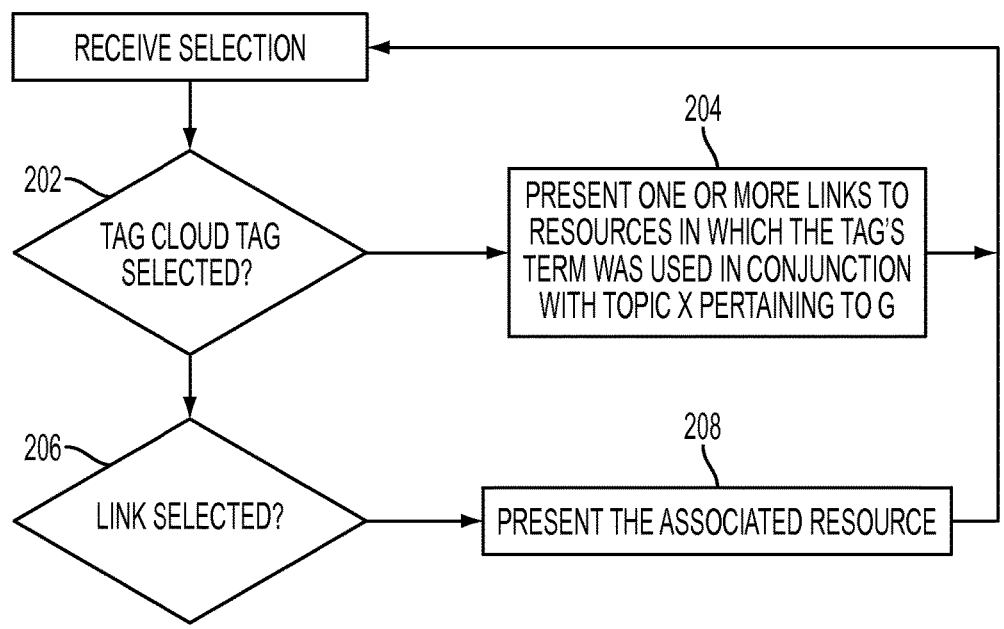
FIG. 2 is a flow diagram illustrating a method of the present disclosure for responding to selections received from a user, e.g., via a user interface that visualizes and enables interaction with a term graph.

At 114, a user is enabled to select components of the displayed tag cloud, and the method proceeds to appropriate behavior (e.g., in the user interface) based on the user selection, e.g., as shown in FIG. 2.

FIG. 2 is a flow diagram illustrating a method of the present disclosure for responding to selections received from a user, e.g., via a user interface that visualizes and enables interaction with a term graph. At 202, if a user selects (e.g., by clicking or touching, or otherwise indicating a selection on a user interface display of the term graph) a tag or component of G's tag cloud, in response, one or more links to resources in which the tag's term was used in conjunction with topic X pertaining to G are presented, e.g., for the user to view at 204.

At 206, if a link (e.g., a link node of a term graph) is selected, in response, the given resource may be presented or displayed at 208, and optionally with instances of the selected term and/or of X highlighted.

Figure 3:
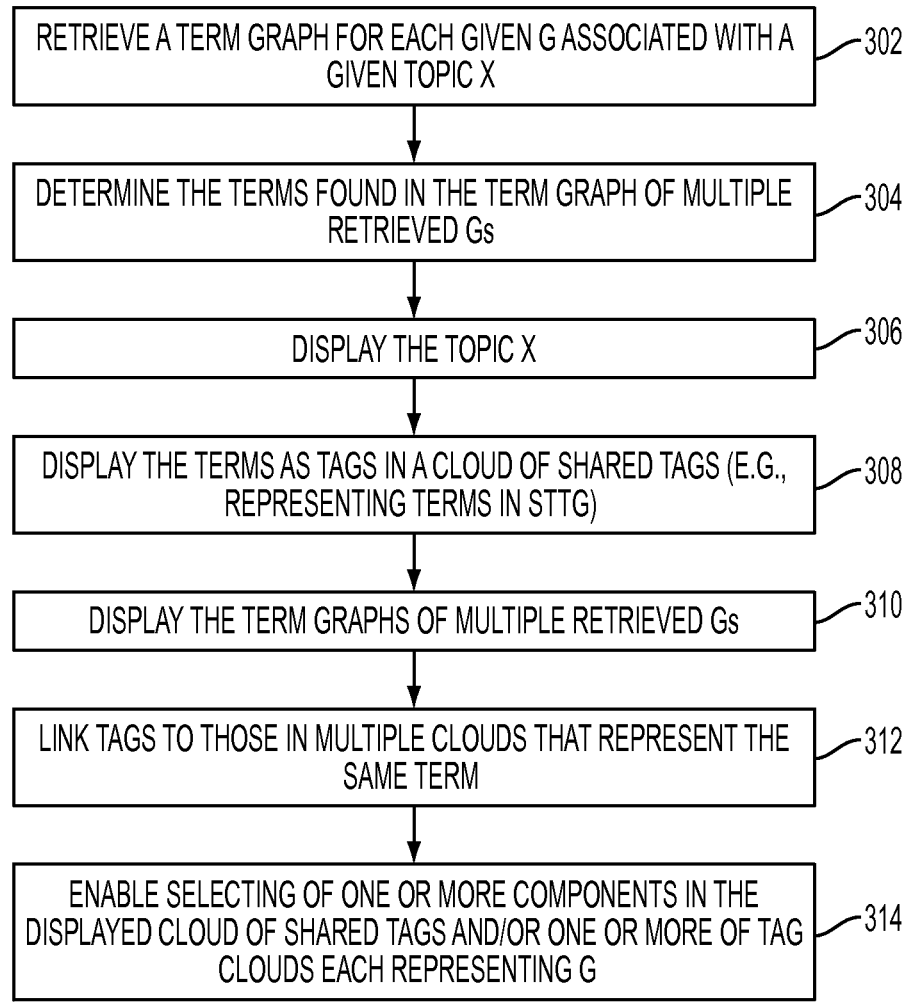
FIG. 3 is a flow diagram illustrating a method of providing a graphical user interface to a joint term graph (also referred to as shared-term term graph) for a given topic X and two or more groups (Gs).

In another aspect, and as also described above, the methodology of the present disclosure also enables viewing multiple term graphs or tag clouds connected via shared terms and their relationships. In one embodiment of the present disclosure, a shared-term term graph (STTG) is displayed as a shared-tag tag cloud (STTC). FIG. 3 is a flow diagram illustrating a method of providing a graphical user interface to a joint term graph (also referred to as shared-term term graph) for a given topic X and two or more groups (Gs). At 302, for each given G, a term graph associated with a given topic X is retrieved. At 304, the terms commonly found in the term graph of multiple retrieved Gs are determined, referred to as shared terms (they may be also referred to as common terms). For example, same (or similar, e.g., based on a threshold of similarity) term is found in multiple term graphs. The processing performed at 302 and 304 are an aspect of a process that creates a shared-term term graph, which may have been performed previously to the actual displaying an viewing of the shared-term term graph. Hence, the displaying or presenting a view of the shared-term term graph may involve displaying an already stored shared-term term graph. In another embodiment, the processing at 302 and 304 may be performed at the time of the displaying. Hence, the shared-term term graph may be created dynamically, e.g., in response to displaying of one or more term graphs. Such dynamically created shared-term term graph may be stored for later use as well as currently being displayed.

At 306, the topic X is displayed. At 308, the shared terms are displayed, e.g., as a cloud of shared tags (STTC) or as another visual set. A visual connection may be displayed between the displayed topic X and the cloud of shared tags. At 310, the terms of multiple term graphs are displayed in their respective tag clouds, e.g., as described with reference to FIG. 1. In one embodiment of the present disclosure, the topic X may be displayed separately in each tag cloud. In another embodiment, the topic X may be displayed in the middle (or thereabout) of a UI display or screen and each tag cloud may be displayed as fanning out from the displayed topic X. For example, assuming two tag clouds, one tag cloud may fan out to the left of the topic X and another tag cloud may fan out to the right of X. Any other display configuration of the components, e.g., the topic X, tag cloud and shared-tag tag cloud, may be employed.

At 312, one or more shared tags (representing shared terms) are linked to the terms in multiple clouds that represent the same term. Again, a logical linking of the shared terms in a shared-term term graph (STTG) and the multiple term graphs may have been performed previously at the time of STTG creation if the STTG already exists. If the STTG is being concurrently created, the logical linking may include defining and storing a reference or pointer in a STTG data model instance. The displaying of those links may include displaying a hyperlink or the like, which when clicked on or otherwise operated on, presents a visual connection.

In one embodiment of the present disclosure, the displayed topic X, the displayed cloud of shared tags, the displayed terms as cloud tags and links of the shared tags and tags in the shared tag cloud and multiple tag clouds provide a display of a joint connected term cloud for the term graphs. A joint connected tag cloud may be a cluster of discrete clouds of various sizes, since a given dimension (e.g., one user) need not understand all of the terms of another. An STTC that aggregates attributes may be displayed that shows the shared terms and associated attributes among and in addition to multiple tag clouds each of which may represent a given term graph representing a group classified by a dimension.

In another embodiment of the present disclosure, not all of those tag clouds need be displayed in a single view at one time. For instance, only an STTC may be displayed that shows the shared terms and associated links and/or information, and for example, based on further input or user requests or another condition, one or more of the multiple tag clouds having one or more common terms may be displayed.

Yet in another embodiment, the shared terms of shared-term term graph is may displayed within the tag clouds (e.g., with a visual indication that the terms are also used or otherwise accessed in one or more other tag clouds), e.g., without the additional display of the shared terms in a separate shared-tag tag cloud. So for example, an STTG or the shared terms may be displayed within those multiple tag clouds, e.g., rather than as an additional distinct cloud of shared terms.

In all instances, the shared terms in the STTC may include links that enable a user to further view the terms and associated data or information in those multiple tag clouds.

In one aspect, where there are n number of Gs, then for each tag in the joint tag cloud, there are up to n+1 numbers displayed: one number for the importance of that term in resources relevant to each of the other connected tag clouds (i.e., relevant to each value set d), and one for the calculated joint importance, I. The importance numbers for each G may have an associated indicator (e.g., the person's initials, a certain color, etc.) so the user can identify the G that the importance measure is associated with. The user may choose to show or hide the individual importance measure, as displaying them may crowd the view when there is a large number of Gs. When the individual importance measures are not shown, they will still be able to be seen via the connections between the tag clouds.

At 314, a user may select one or more components (tags) of the displayed shared-tag tag cloud and/or one or more of the multiple tag clouds that each represents a G.

Figure 4:
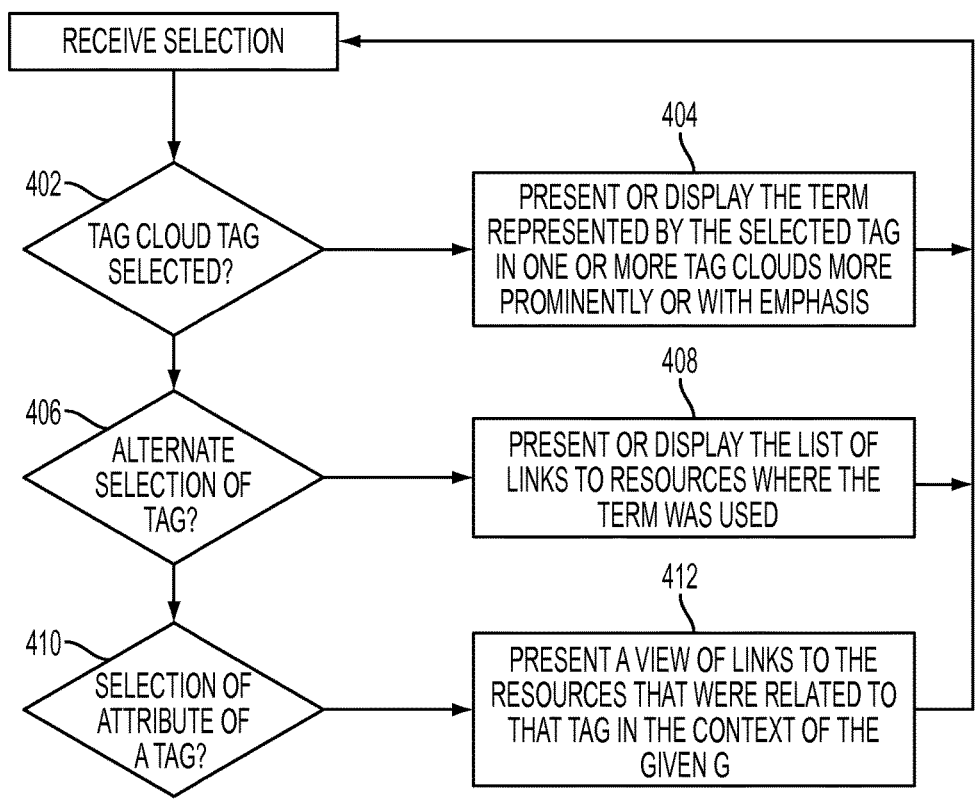
FIG. 4 is a flow diagram illustrating a logic performed in response to receiving a selection of one or more components of multiple term graphs displayed as multiple tag clouds in one embodiment of the present disclosure.

FIG. 4 is a flow diagram illustrating a logic performed in response to receiving a selection of one or more components of multiple term graphs displayed as multiple tag clouds in one embodiment of the present disclosure. At 402, if a selection of a tag is received in any individual tag cloud or in the joint tag cloud, in response at 404, that term in one or more tag clouds is displayed more prominently or with emphasis, for example, by highlighting it, changing its color, etc., so for example, the user can observe the relationship between the selected tag and topic X in one or more Gs, as well as those relationships relative to each other.

At 406, if an alternate selection (for example, double click, double tap, command-click, etc.) of the tag in any of the tag clouds (e.g., including STTC) is detected, in response at 408, the list of links to resources where the term was used is displayed. One can optionally select a link to view a resource, e.g., as described with reference to FIG. 2. In one embodiment of the present disclosure, an alternate selection of a tag on the STTC may have the same effect as selecting the calculated joint importance, I, described below.

At 410, if an importance measure (attribute) of a given G in the joint tag cloud is selected, in response at 412, a view of links to the resources that were related to that tag in the context of the given G is provided. A selection of the number of calculated joint importance, I, displays a view which provides links to the resources wherein there was a relation to two or more Gs. One can optionally select a link to view a resource. A link may be a hyperlink, which when clicked may navigate to a view that shows the resources, for example, a web page link that navigates to another page. However, the type of link is not limited to hypertext markup language (HTML) links from a web page. A link may be implemented via any other display technology, another protocol and addressing of the link need not be limited to HTTP.

The alternate selection at 406 performs alternate selection on the tag itself. The selection of an attribute at 410 refers to selecting an attribute displayed in an STTC. For example, the STTC may show a tag below which the total number of uses of a term by all the resources in all the other tag clouds may be displayed. Selecting that number (attribute) presents a view with links to all those resources, optionally grouped by the tag cloud they came from or another way that indicates which tag cloud(s) each resource was included in.

Figure 6:
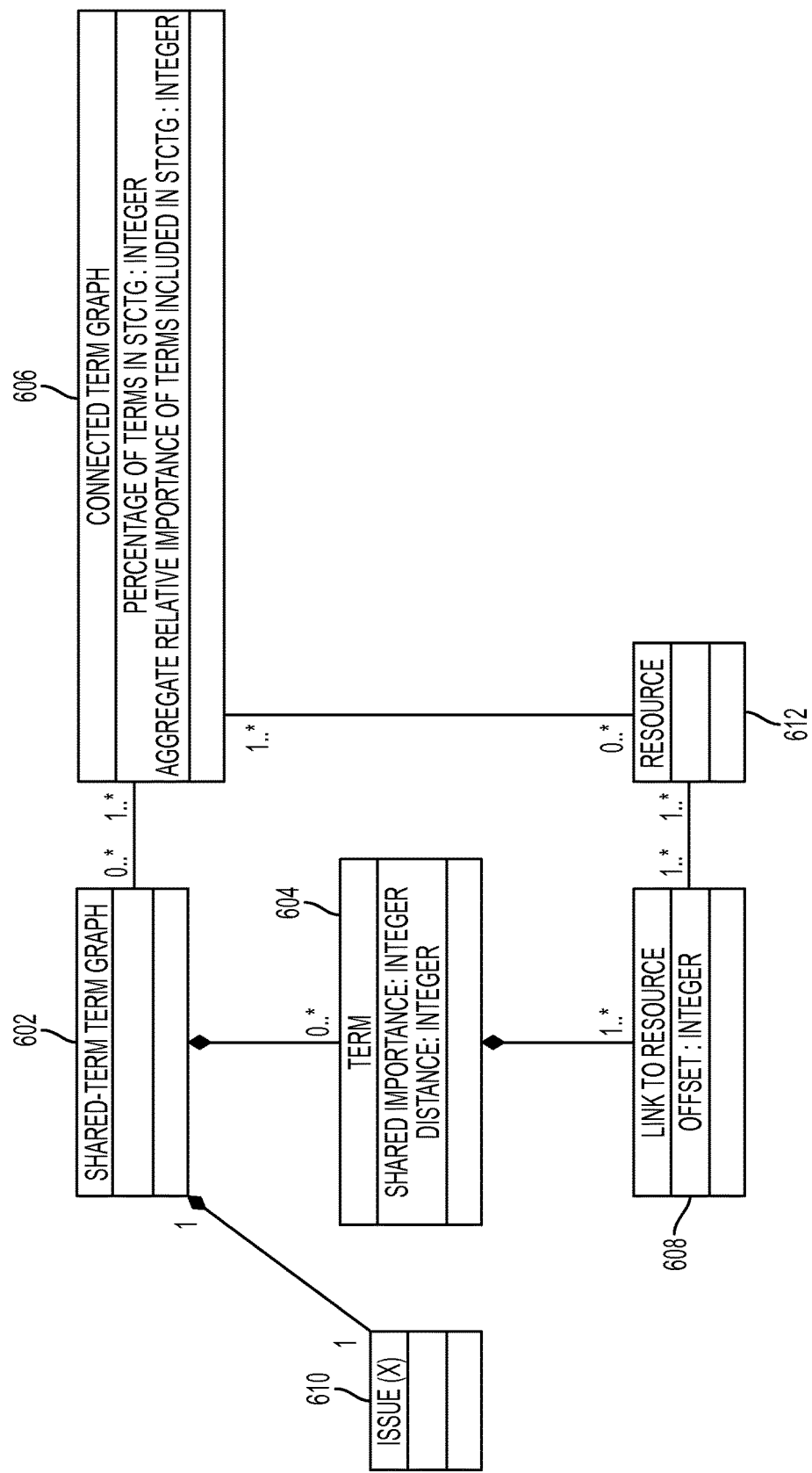
FIG. 6 is a unified modeling language (UML) diagram that illustrates an example of shared-term term graph that represents shared terms in multiple term graphs and is displayed in one embodiment of the present disclosure.

FIG. 6 is a unified modeling language (UML) diagram that illustrates an example of shared-term term graph that represents shared terms in multiple term graphs in one embodiment of the present disclosure. A shared-term term graph (STTG) includes the terms found in the term graphs of two or more Gs of interest, for instance, whose individual term graphs are being displayed and/or used. Those term graphs need not be connected, as the "connector" nodes found in one G's term graph may be absent from another G's term graph. An STTG, also referred to as a joint connected tag cloud is created to represent a joint term graph. A joint connected tag cloud is also referred to as a group of tag clouds. The need for multiple tag clouds, instead of one tag cloud, arises if the joint term graph is not a connected graph, in which case each tag cloud in this group of tag clouds will represent one connected subgraph. If desired, one can choose to generate all of the n choose k STTGs when a new G is added, or to postpone generation until a given STTG is requested. Generating upon addition can result in faster response time for subsequent requests, e.g., accesses and/or views.

An STTG 602 in one embodiment may include a node 604 for each term shared by the two or more connected term graphs 606 of interest. A term is shared if it is present in two or more of the connected term graphs of interest. Node attributes of a term node 604 may include the term, the shortest distance of that term from X 610 in the STTG, and the shared importance of the term, which indicates the importance of the term in the context shared by the two or more connected term graphs 606 in which it appears. Shared importance may be determined, for example, by the weighted number of shared usages, where the weight of each shared usage may be affected by any of the factors used to establish importance of a term in a single term graph. Shared usages indicate a level of shared context between the multiple values of D (for example, where D is person, a shared use indicates that the term is useful for facilitating communication between people).

An STTG 602 may also include or store links 608 (references or pointers or the like) to all the resources 612 wherein there was a shared usage. Offsets to all instances of the term in each resource (e.g., the location in the resource where the term appears) linked to may be stored as well, e.g., to allow quick access to the term in context of the resource. For each of the connected term graphs of interest 606, an STTG 602 may also include the percentage of its terms present in the STTG and the aggregate relative importance of the terms included in the STTG. For example, if a source graph has 100 terms, 5 of which have a high importance and 50 of which have a low importance, inclusion of the 5 of high importance may result in a greater aggregate relative importance than inclusion of 20 terms of low importance. The entire process can be repeated where the two or more term graphs share the identical values of D, but have different values of X. In such a case, the STTG facilitates comparing the relative importance, distance, etc., for the same classified dimension as X varies.

The cardinalities shown in the UML diagrams in FIG. 5 and FIG. 6 (e.g., "1 . . . *", "0 . . . *", "1") represent in one embodiment the data models of the present disclosure used to store data associated with many issues, groups, term graphs, ontologies, resources, dimensions, and other data.

Figure 8:
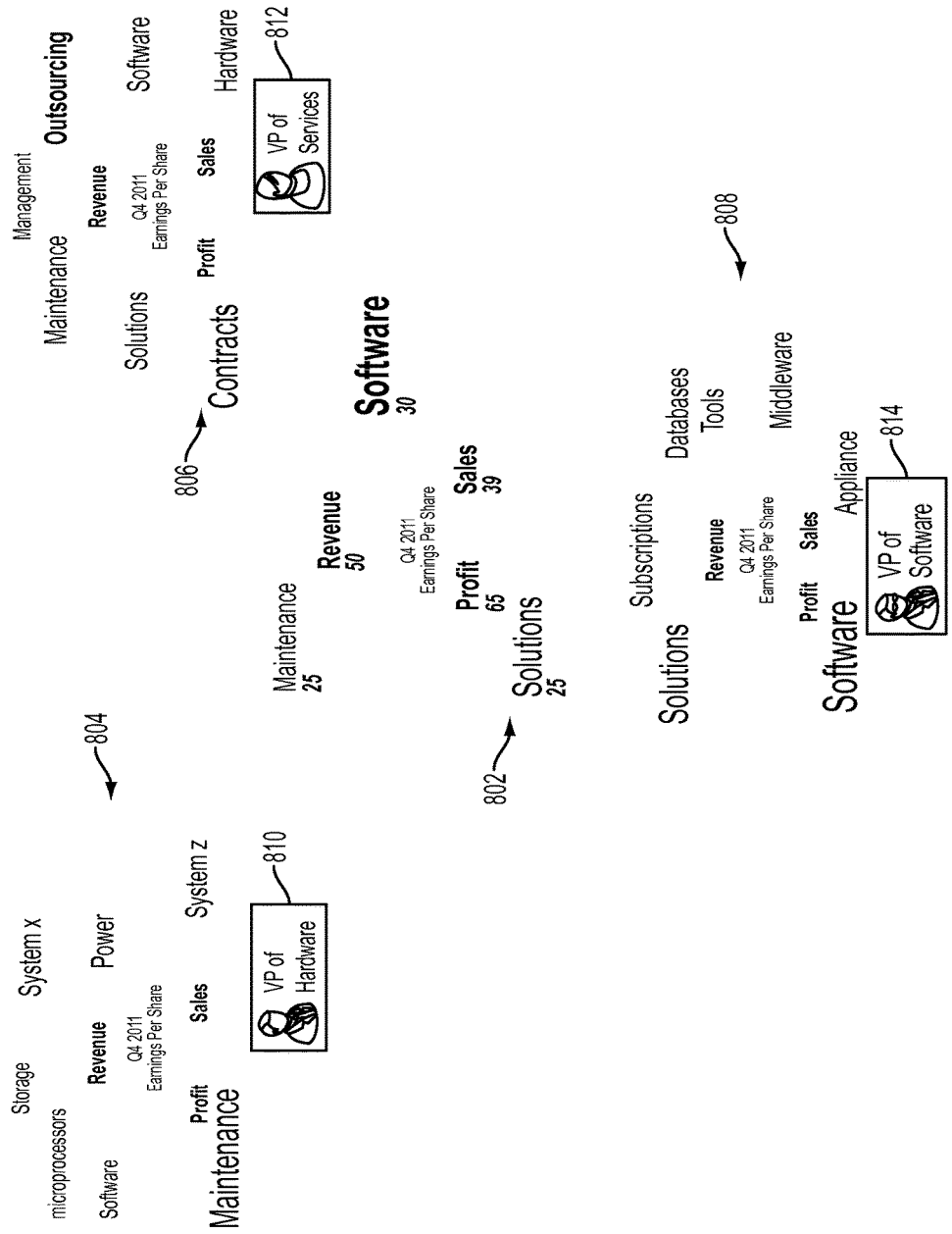
FIG. 8 illustrates sample connected tag clouds with a shared-tag tag cloud in one embodiment of the present disclosure.

FIG. 8 illustrates sample connected tag clouds with a shared-tag tag cloud in one embodiment of the present disclosure. In this example, "Q4 2011 Earnings Per Share" is the topic, shown in the center of each connected tag cloud (804, 806, 808) and STTC 802. Topic may be shown elsewhere (not limited to the center). There are connected clouds for 3 (804, 806, 808) different vice presidents (VPs) (810, 812, 814), and one STTC 802 in the middle. So in this example, VPs represent dimension values (corresponding term graph having been classified by VP dimension with different VPs). In this example, the importance values of the terms relative to the topic to each VP are shown visually by its size in each tag cloud. This example also shows the term "software" as having been selected, and hence shows that term highlighted (or e.g., in red color) in all the clouds 802, 804, 806, 808. The number values below each shared term in the STTC 802 illustrates an aggregate importance value. FIG. 8 shows one example visualization of tag clouds and shared-tag tag cloud; variations to the visualization are possible in the present disclosure.

As discussed above, term graphs of the present disclosure may facilitate communications and/or provide better insight and understanding of an issue or topic along a dimension or across different dimensions, for example, in an organization. For example, consider term graphs built using one or more ontologies of the organization, according to a methodology of the present disclosure in one embodiment, along a user dimension (D) for different users (values d of D), e.g., user A (a vice president of analytics products), user B (a chief statistician), user C (development manager), user D (visualization technical guru), and user E (a software engineer) for a topic, e.g., a software product. An organization's ontology may have a node that represents the software product in its ontology graph (data structure). Each of those users has a term graph related to that topic (in this example, software product) and which is linked to the ontology node. The term graph may include terms associated with the topic, which terms have been used or appear in various resources accessed (or otherwise used) by the corresponding user, e.g., internal documents, presentations, emails, and/or other items associated with the organization, and/or publicly available information, e.g., information on competitors, and other information. The term graph may also include importance measures of how significantly a term is treated or considered by the user. Such term graphs would provide an overview of different perspectives those users (whose jobs may have different focuses) have regarding albeit the same topic.

For example, one or more of those users (user A, user B, user C, user D, user E) may prepare for a meeting to be held among them, by viewing or otherwise evaluating the term graphs (e.g., exploring the tag clouds that present the term graphs) associated with one or more of the users and determining based on, e.g., the importance values stored for the terms in the term graphs, what aspect about the same topic each user is focused on or more is concerned about. In one embodiment, the term graphs may be retrieved or presented as tag clouds for exploring, e.g., by a query that queries the desired ontology with a specified user and topic.

The one or more of those users may also explore an STTG, e.g., via presentation of a corresponding STTC, to determine which terms are shared among those different users' term graphs. This way, it is possible to determine what users have in common, e.g., explore in a single view, what same terms and resources those users have used.

While the above example illustrated one use case of a methodology of the present disclosure, with an organization as entity and users as group dimension, it should be understood that the methodology is not limited to only such example scenario. For example, term graphs may be created for different dimensions, combination of different dimensions, and/or different entities. For instance, term graphs may be created and explored along a time dimension, e.g., terms used in different duration of time, or combinations of multiple dimensions. Ontologies need not be limited to an organization's ontology, but can be related to another entity, e.g., logical entity, which shares terms and concepts. For example, there may be ontologies associated with an industry, business, project, and others.

Term graphs and STTG, and the method of visualizing the same disclosed in the present disclosure may have many different applications. For instance, they may be used as an application/tool for preparing for meetings, presentations, etc., and may help the presenter understand the context and perspective of each attendee. Another application may be as an add-on to email and/or instance messaging (IM) clients, e.g., to provide instant context when communicating via those means to help a user quickly decide what terms to use with the other party, and also help a user understand the use of a given term by the other party. Yet another application may be as a tool used in team selection and communication. Such tool may allow a user to select one or more names/identifications (IDs) in a directory, contacts list, etc., or enter one or more names, provide a short text description of the business issue, and see tag clouds. This can be used to select team members based on their amount of shared usages with each other, select teams members based on their shared usage of key terms relevant to the business issue, facilitate communication between the team members by using shared terms and better understand each others' contexts.

Another example application is in multi-dimensional data exploration, e.g., where each tag cloud is for one set of dimensions, and the joint cloud shows comparative importance for some importance measure in the data sets. For example, considering each term as a gene, different sequences, pools, etc. can be compared, e.g., see what they have or do not have in common. As another example, health profiles of sets of people or individual people may be compared. Yet another example may be in identifying most important health, business, or other issues to address for a given set of people, entities, etc.

Still another example application may be in comparative monitoring, e.g., to have events or feeds feeding two clouds, with importance measures changing based on the input. For example, the data structure of the present disclosure may be used to monitor the terms such as enterprise or organization names, "database", "hardware", etc., to watch for relative importance of the enterprises related to given markets, customers, etc.

Yet another application may be in federation and/or sharing of clouds, such that multiple entities can selectively understand, and share with, each other. For example, selective information may be shared with customers about products. Social software may also utilize the data structure of the present disclosure, for example for allowing people to get to know each other, find people with similar terms/tags, and get to know each other via the tag clouds.

Figure 7:
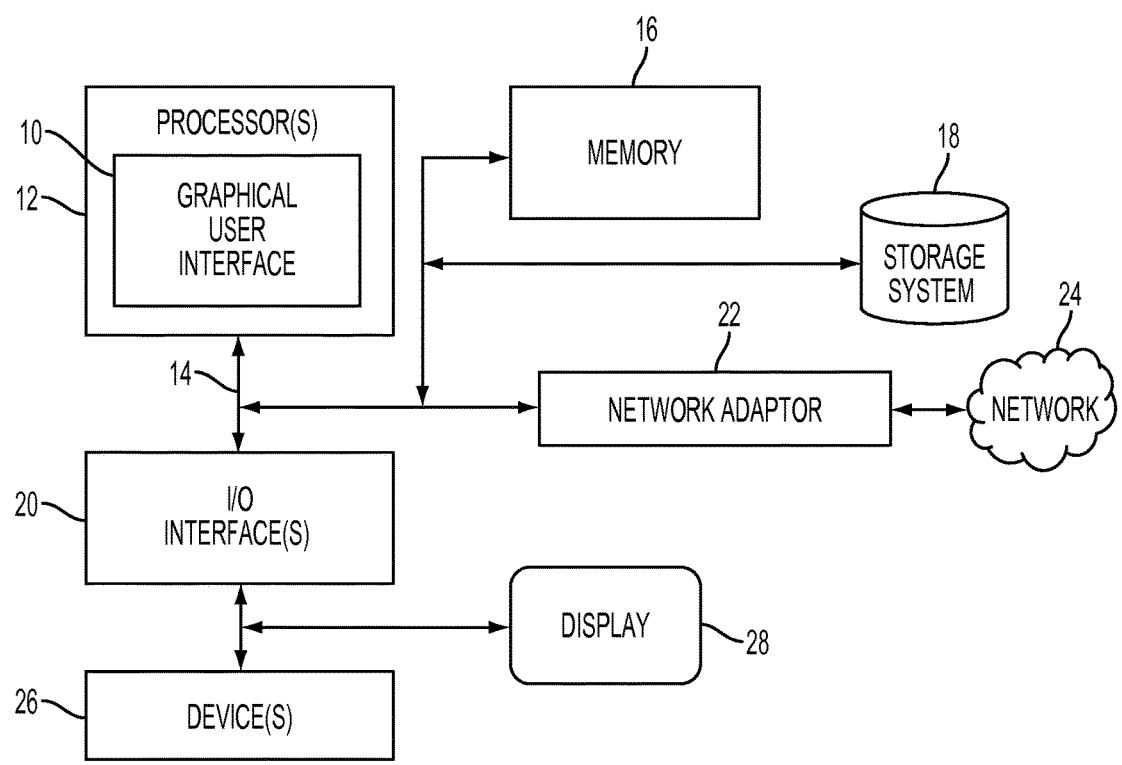
FIG. 7 illustrates a schematic of an example computer or processing system that may implement the graphical user interface system in one embodiment of the present disclosure.

FIG. 7 illustrates a schematic of an example computer or processing system that may implement the graphical user interface system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 7 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a GUI module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages, a scripting language such as Perl, VBS or similar languages, and/or functional languages such as Lisp and ML and logic-oriented languages such as Prolog. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A computer readable storage medium storing a program of instructions executable by a machine to perform a method of visualizing and interacting with a given term graph for a given group G defined by a set of values d for a set of dimensions D and topic X, comprising:

obtaining the term graph associated with the given group G and the topic X, nodes of the term graph occurring in an ontology of a given entity as a connected subgraph in the ontology and linked to a node in the ontology representing the topic X;

displaying the topic X in a tag cloud;

representing each term from the term graph as a tag in the tag cloud, wherein a distance of a given tag from the displayed topic X in the tag cloud represents a distance of a term represented by the given tag in the term graph from the topic X, the distance representing how closely the term is considered to be related to the topic X by an organization as given by the organization's ontology;

visually representing a tag's importance relative to one or more of resources associated with the given group G in the tag cloud, wherein a separate term graph is created of terms associated with each group G, and wherein two term graphs are connected by sharing of at least one term; and displaying a shared-tag tag cloud comprising common terms that are commonly occurring in at least two group Gs additional to displaying the multiple tag clouds representing respective group Gs and displaying the tag cloud associated with said each group G as fanning out from the shared-tag tag cloud, the common terms in the shared-tag tag cloud displayed with visual attributes determined as a function of a number of the common terms occurring in the group Gs, wherein all common terms occurring in the at least two group Gs are displayed as a first clustered set positioned together as a group in the middle of a user interface display, and each set of terms occurring in said each respective group G is displayed as a second clustered set as a group, wherein each of the second clustered set comprising all terms in the respective group G is displayed as surrounding said first clustered set, wherein the displaying steps are performed by a processor executing the graphical user interface displaying on a display device, wherein a user is allowed to choose whether an access to a given resource from the graphical user interface via which the term graph is being visualized will increment a usage count of the given resource, wherein the term graph is stored in a data structure format in a memory device coupled to the processor, and wherein a plurality of term graphs can be created for the given group G, but only one term graph is created per the ontology for the given group G.

2. The computer readable storage medium of claim 1, wherein in response to receiving a selection of a tag in the tag cloud, presenting a view of one or more links to one or more of the resources in which a term associated with the selected tag was used in conjunction with the topic X, and wherein in response to receiving a selection of the one or more links, displaying said one or more of the resources linked to the selected one or more links.

3. A computer readable storage medium storing a program of instructions executable by a machine to perform a method of visualizing and interacting with a joint term graph for a given topic X and two or more group Gs, each of the group Gs defined by a set of values d for a set of dimensions D, comprising:
   identifying one or more shared terms that are commonly used in two or more term graphs associated with respective two or more group Gs;
   presenting the shared terms;
   retrieving a term graph associated with said each group G associated with topic X, the term graph occurring in an ontology of a given entity as a connected subgraph in the ontology and linked to a node in the ontology representing the topic X;
   identifying a set of terms in the term graph associated with said each group G;
   displaying, by a processor, the set of terms as tags in a tag cloud for each group G, wherein multiple tag clouds are displayed;
   linking, for each of the shared terms, a shared term to a tag in the tag clouds that represents a same term as the shared term,
   wherein a separate term graph is created of terms associated with each group G, and wherein two term graphs are connected by sharing of at least one term; and
   displaying a shared-tag tag cloud comprising common terms that are commonly occurring in at least two group Gs additional to displaying the multiple tag clouds representing respective group Gs, wherein the multiple tag clouds are displayed as fanning out from the shared-tag tag cloud, the common terms in the shared-tag tag cloud displayed with visual attributes determined as a function of a number of the common terms occurring in the group Gs,
   wherein all common terms occurring in the at least two group Gs are displayed as a first clustered set positioned together as a group in the middle of a user interface display, and each set of terms occurring in said each respective group G is displayed as a second clustered set as a group, wherein each of the second clustered set comprising all terms in the respective group G is displayed as surrounding said first clustered set,
   wherein a user is allowed to choose whether an access to a given resource from the graphical user interface via which the term graph is being visualized will increment a usage count of the given resource,
   wherein the term graph is stored in a data structure format in a memory device coupled to the processor, and wherein a plurality of term graphs can be created for said each group G, but only one term graph is created per the ontology for said each group G.

4. The computer readable storage medium of claim 3, wherein the presenting the shared terms comprises displaying each of the shared terms as a tag in a shared-tag tag cloud in addition to the multiple tag clouds.

5. The computer readable storage medium of claim 4, wherein the tag in the shared-tag tag cloud further displays one or more attributes associated with the tag.

6. A system for visualizing and interacting with a given term graph for a given group G defined by a set of values d for a set of dimensions D and topic X, comprising:
   a processor; and
   a graphical user interface module operable to execute on the processor and further operable to obtain the term graph associated with the given group G and the topic X, the term graph occurring in an ontology of a given entity as a connected subgraph in the ontology and linked to a node in the ontology representing the topic X, display the topic X in a tag cloud, represent each term from the term graph as a tag in the tag cloud, wherein a distance of a given tag from the displayed topic X in the tag cloud represents a distance of a term represented by the given tag in the term graph from the topic X, the distance representing how closely the term is considered to be related to the topic X by an organization as given by the ontology, the graphical interface module further operable to visually represent a tag's importance relative to one or more of resources associated with the given group G in the tag cloud,
   wherein a separate term graph is created of terms associated with each group G, and wherein two term graphs are connected by sharing of at least one term,
   the graphical interface module further operable to display a shared-tag tag cloud comprising common terms that are commonly occurring in at least two group Gs additional to the multiple tag clouds representing respective group Gs, and display the tag cloud associated with said each group G as fanning out from the shared-tag tag cloud, the common terms in the shared-tag tag cloud displayed with visual attributes determined as a function of a number of the common terms occurring in the group Gs,
   wherein all common terms occurring in the at least two group Gs are displayed as a first clustered set positioned together as a group in the middle of a user interface display, and each set of terms occurring in said each respective group G is displayed as a second clustered set as a group, wherein each of the second clustered set comprising all terms in the respective group G is displayed as surrounding said first clustered set,
   wherein a user is allowed to choose whether an access to a given resource from the graphical user interface via which the term graph is being visualized will increment a usage count of the given resource,
   wherein the term graph is stored in a data structure format in a memory device coupled to the processor, and wherein a plurality of term graphs can be created for the given group G, but only one term graph is created per the ontology for the given group G.

7. The system of claim 6, wherein the graphical user interface module is further operable to identify one or more shared terms that are commonly used in two or more term graphs associate with respective two or more group Gs, present the shared terms, and link, for each of the shared terms, a shared term to a tag in the tag clouds that represents a same term as the shared term.

8. The system of claim 7, wherein the graphical user interface module is operable to present the shared terms by displaying each of the shared terms as a tag in a shared-tag tag cloud in addition to the multiple tag clouds.

9. The computer readable storage medium of claim 1, wherein the term graph is stored in memory according to a data model comprising a dimension data structure, a group data structure, a term graph data structure, an issue data structure, a term data structure, a link-to-resource data structure and a resource data structure, wherein an instance of the dimension data structure is configured to have an association with zero to many instances of the group data structure, an instance of the group data structure is configured to have an association with one to many instances of the dimension data structure, the instance of the group data structure is configured to have an association with one instance of the term graph data structure, an instance of the term graph data structure is configured to contain one to many instances of the term data structure and one instance of the issue data structure, an instance of the term data structure is configured to contain one to many instances of the link-to-resource data structure, an instance of the link-to-resource data structure is configured to have an association with one to many instances of the resource data structure, and an instance of the resource data structure is configured to have an association with zero to many instances of the link-to-resource data structure.

10. The computer readable storage medium of claim 3, wherein the term graph is stored in memory according to a data model comprising a dimension data structure, a group data structure, a term graph data structure, an issue data structure, a term data structure, a link-to-resource data structure and a resource data structure, wherein an instance of the dimension data structure is configured to have an association with zero to many instances of the group data structure, an instance of the group data structure is configured to have an association with one to many instances of the dimension data structure, the instance of the group data structure is configured to have an association with one instance of the term graph data structure, an instance of the term graph data structure is configured to contain one to many instances of the term data structure and one instance of the issue data structure, an instance of the term data structure is configured to contain one to many instances of the link-to-resource data structure, an instance of the link-to-resource data structure is configured to have an association with one to many instances of the resource data structure, and an instance of the resource data structure is configured to have an association with zero to many instances of the link-to-resource data structure.

11. The system of claim 6, wherein the term graph is stored in memory according to a data model comprising a dimension data structure, a group data structure, a term graph data structure, an issue data structure, a term data structure, a link-to-resource data structure and a resource data structure, wherein an instance of the dimension data structure is configured to have an association with zero to many instances of the group data structure, an instance of the group data structure is configured to have an association with one to many instances of the dimension data structure, the instance of the group data structure is configured to have an association with one instance of the term graph data structure, an instance of the term graph data structure is configured to contain one to many instances of the term data structure and one instance of the issue data structure, an instance of the term data structure is configured to contain one to many instances of the link-to-resource data structure, an instance of the link-to-resource data structure is configured to have an association with one to many instances of the resource data structure, and an instance of the resource data structure is configured to have an association with zero to many instances of the link-to-resource data structure.

\* \* \* \* \*